US009611713B2

United States Patent
Wood et al.

(10) Patent No.: US 9,611,713 B2
(45) Date of Patent: Apr. 4, 2017

(54) CEMENT DEVICE RELEASE MECHANISM

(71) Applicant: Weatherford Technology Holdings, LLC, Houston, TX (US)

(72) Inventors: Kevin Wood, Houston, TX (US); Richard Lee Giroux, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 225 days.

(21) Appl. No.: 14/201,575

(22) Filed: Mar. 7, 2014

(65) Prior Publication Data

US 2014/0260732 A1 Sep. 18, 2014

Related U.S. Application Data

(60) Provisional application No. 61/778,283, filed on Mar. 12, 2013.

(51) Int. Cl.
*E21B 33/05* (2006.01)
*F16H 35/00* (2006.01)

(52) U.S. Cl.
CPC .............. *E21B 33/05* (2013.01); *F16H 35/00* (2013.01); *Y10T 74/18568* (2015.01); *Y10T 74/18576* (2015.01)

(58) Field of Classification Search
CPC ......... E21B 33/05; E21B 33/068; E21B 33/16
See application file for complete search history.

(56) References Cited

U.S. PATENT DOCUMENTS

| 4,427,065 A | 1/1984 | Watson |
| 4,782,894 A | 11/1988 | LaFleur |
| 5,787,979 A | 8/1998 | Giroux et al. |
| 5,960,881 A | 10/1999 | Allamon et al. |
| 6,009,944 A | 1/2000 | Gudmestad |
| 6,311,771 B1 | 11/2001 | Gudmestad et al. |
| 6,491,103 B2 | 12/2002 | Allamon et al. |
| 6,672,384 B2 | 1/2004 | Pedersen et al. |
| 6,776,228 B2 | 8/2004 | Pedersen et al. |
| 6,904,970 B2 | 6/2005 | Simson |
| 2008/0277108 A1* | 11/2008 | Bouligny, Jr. .......... E21B 19/07 166/77.52 |

(Continued)

OTHER PUBLICATIONS

PCT International Search Report and Written Opinion dated Dec. 1, 2014, International Application No. PCT/US2014/022117.

(Continued)

*Primary Examiner* — David Andrews
(74) *Attorney, Agent, or Firm* — Patterson & Sheridan, LLP

(57) ABSTRACT

A holding device having release mechanisms for securing and releasing one or more ball, dart, and/or plug members from the holding device into a tubular string disposed in a wellbore. The release mechanisms may include a planetary gear arrangement for extending and retracting a plunger member disposed below the ball, dart, and/or plug members. The release mechanisms may include a bevel gear arrangement for extending and retracting a finger support member disposed below the ball, dart, and/or plug members. The release mechanisms may include a pivotable, spring type arrangement for extending and retracting a finger support member disposed below the ball, dart, and/or plug members.

16 Claims, 14 Drawing Sheets

(56) References Cited

U.S. PATENT DOCUMENTS

2010/0264346 A1* 10/2010 Bussear ............... E21B 34/066
                                                    251/250.5
2010/0294511 A1   11/2010 Winzer
2012/0068098 A1    3/2012 Arai
2012/0279717 A1* 11/2012 Young ................. E21B 33/068
                                                    166/318

OTHER PUBLICATIONS

Canadian Office Action dated Jul. 18, 2016, for Canadian Patent Application No. 2,903,016.

* cited by examiner

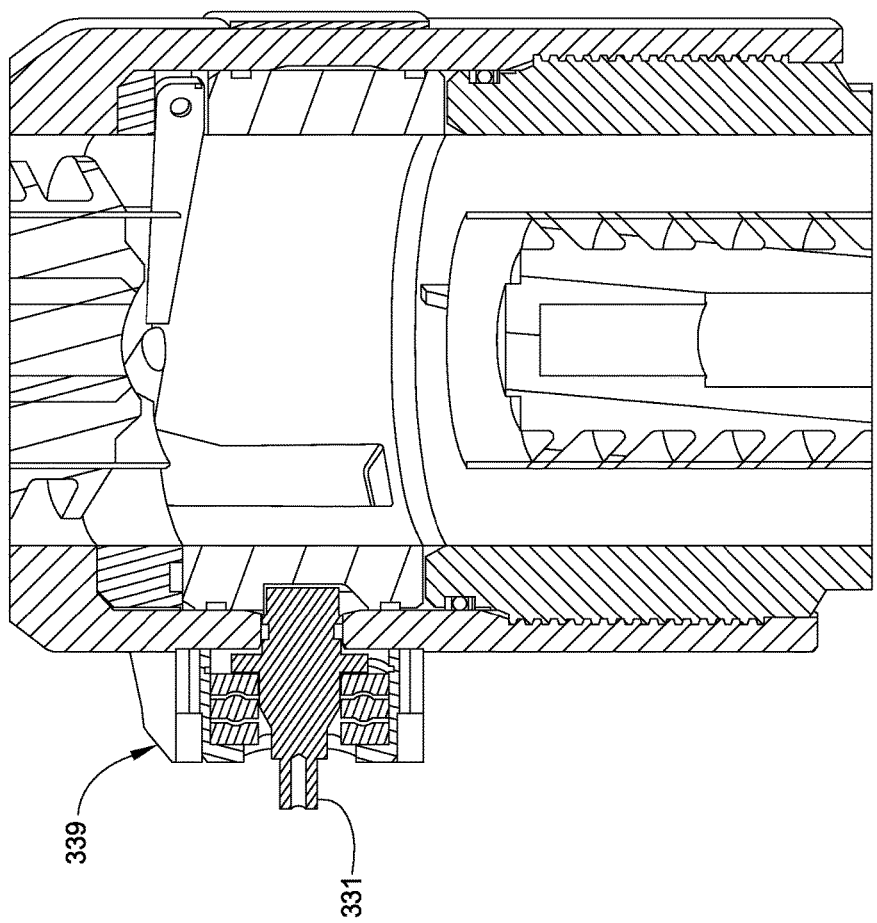

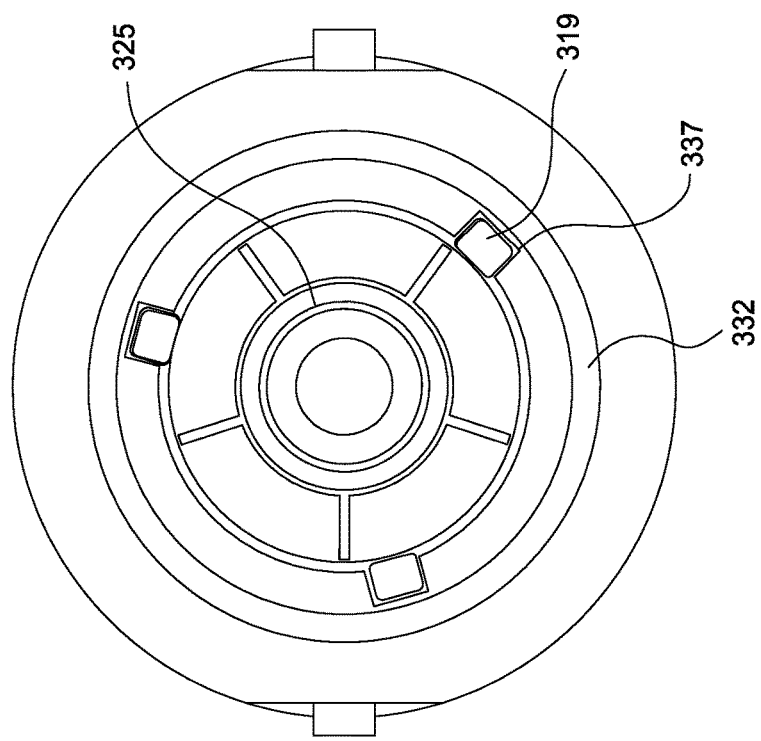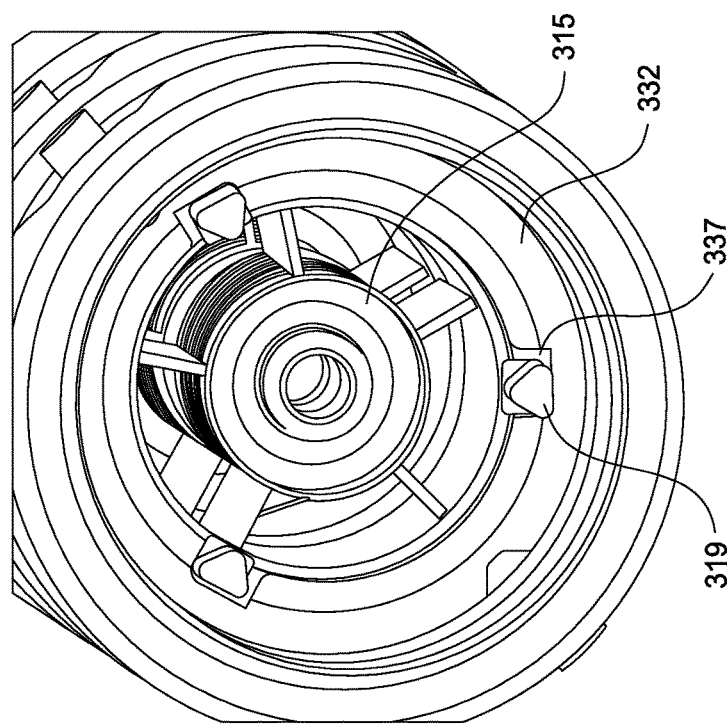
FIG. 3 I
FIG. 3H

CEMENT DEVICE RELEASE MECHANISM

CROSS REFERENCE TO RELATED APPLICATION

This application claims benefit of U.S. Provisional Application No. 61/778,283, filed Mar. 12, 2013, the contents of which are herein incorporated by reference in their entirety.

BACKGROUND OF THE INVENTION

Field of the Invention

Embodiments of the invention generally relate to release mechanisms for securing and subsequently releasing ball, dart, and/or plug type members from a holding device into a tubular string disposed in a wellbore.

Description of the Related Art

In the drilling of oil and gas wells, a wellbore is formed using a drill bit that is urged downwardly at a lower end of a drill string. After drilling a predetermined depth, the drill string and bit are removed and the wellbore is lined with a string of casing. An annular area is thus formed between the string of casing and the formation. A cementing operation is then conducted in order to fill the annular area with cement. The combination of cement and casing strengthens the wellbore and facilitates the isolation of certain areas of the formation behind the casing for the production of hydrocarbons.

As is well known in the art, during the cementing operation, a pair of cementing plugs may be used to separate the cement slurry from other fluids. A first cement plug (having a rupture disk) may be dropped into the tubular string ahead of the cement slurry, and a second cement plug may be dropped behind the cement slurry. The first cement plug may land at a location near the end of the tubular string, and the pressurized cement slurry behind it may rupture the rupture disk and flow through into the annular area surrounding the tubular string. The second cement plug may force the cement slurry through the tubular string until it lands on the second cement plug, thereby closing fluid flow through and providing a pressure rise indication that the cement slurry has been circulated to the appropriate location. The cementing plugs may then be sheared from the tubular string and/or drilled through for subsequent operations.

The cementing plugs are usually secured in and released from a cementing head that is coupled to the tubular string through which various fluids, including the cement slurry, flow through. Current cementing head designs, however, are inadequate for securing and/or releasing cement plugs quickly and efficiently. Current cementing head designs are also inadequate for effectively allowing fluid flow through the cement head and around the cementing plugs that are disposed in the cementing head.

Therefore, there is a need for new and/or improved holding device release mechanisms for securing and releasing ball, dart, and/or plug type members into a tubular string disposed in a wellbore.

SUMMARY OF THE INVENTION

A holding device having a release mechanism.

In one embodiment, a release mechanism may comprise a support member movable from an extended position to a retracted position; a rotatable actuation member for actuating the support member from the extended position to the retracted position; and a drive member for rotating the rotatable actuation member.

In one embodiment, a method of operating a release mechanism may comprise flowing fluid through a flow bore of the release mechanism while retaining a member within the flow bore via a support member; rotating an actuation member to move the support member from an extended position that retains the member within the flow bore to a retracted position that releases the member from the flow bore; and releasing the member from the release mechanism.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate a release mechanism according to one embodiment.

FIGS. 3H-3I illustrate bottom and top elevational views, respectively, of the holding device in a second operation position according to one embodiment.

DETAILED DESCRIPTION

Although some of the embodiments of the invention are described with respect to a cementing head and cementing plugs, the embodiments described herein may apply to other types of holding devices, release mechanisms, and ball, dart, and/or plug type members.

Figure 1A:
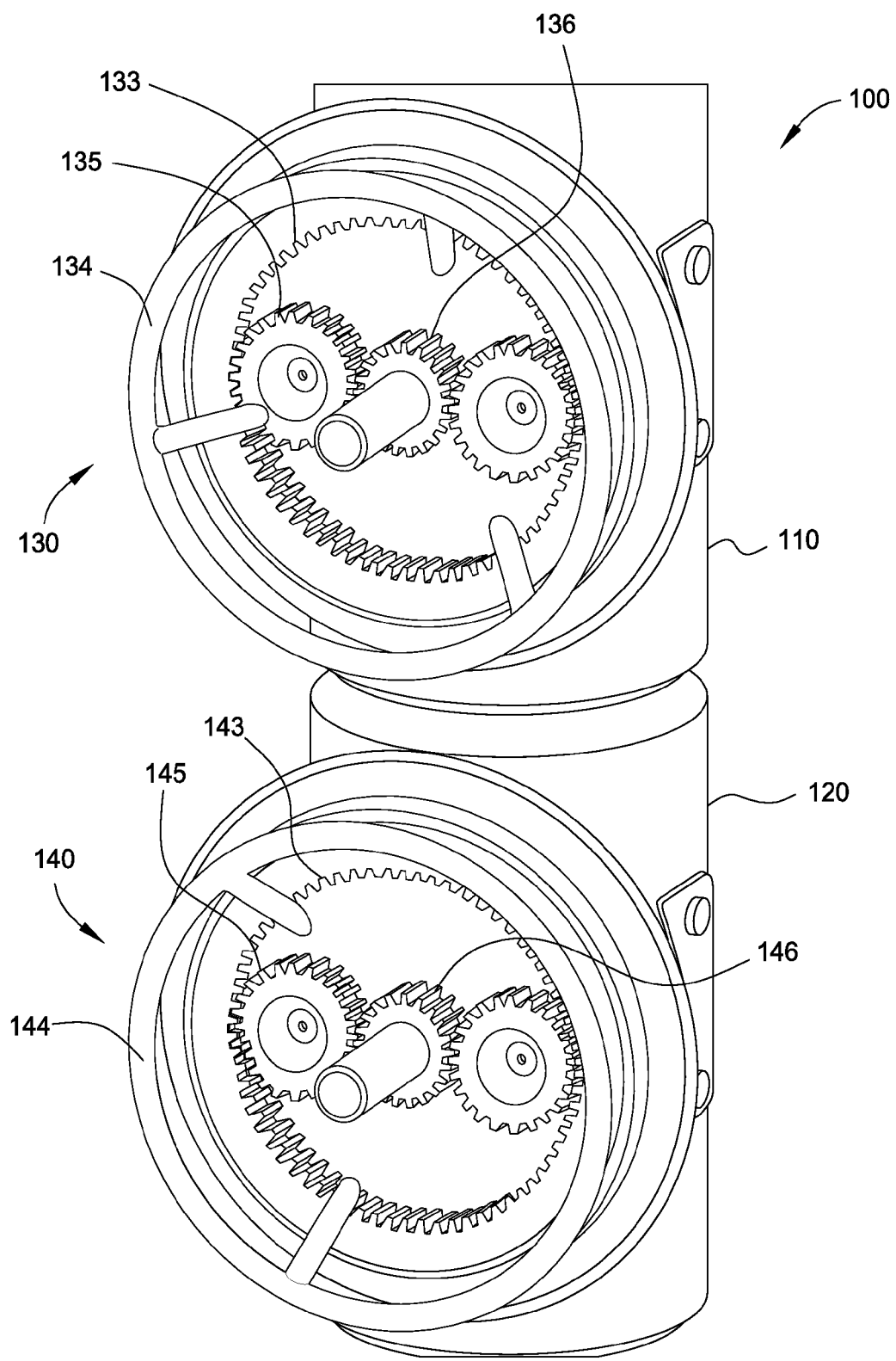
FIG. 1A illustrates a holding device according to one embodiment.

FIG. 1A illustrates a holding device 100 according to one embodiment. The holding device 100 includes an upper tubular member 110 coupled to a lower tubular member 120, such as by a threaded connection, and further includes a first release mechanism 130 and a second release mechanism 140. The upper and lower tubular members 110, 120 may be similarly coupled to other tubular strings, devices, and/or equipment as known in the art. The holding device 100 is operable to secure and release one or more ball, dart, and/or plug type members supported within the holding device 100, while permitting fluid flow through the upper and lower tubular members 110, 120.

Figure 1C:
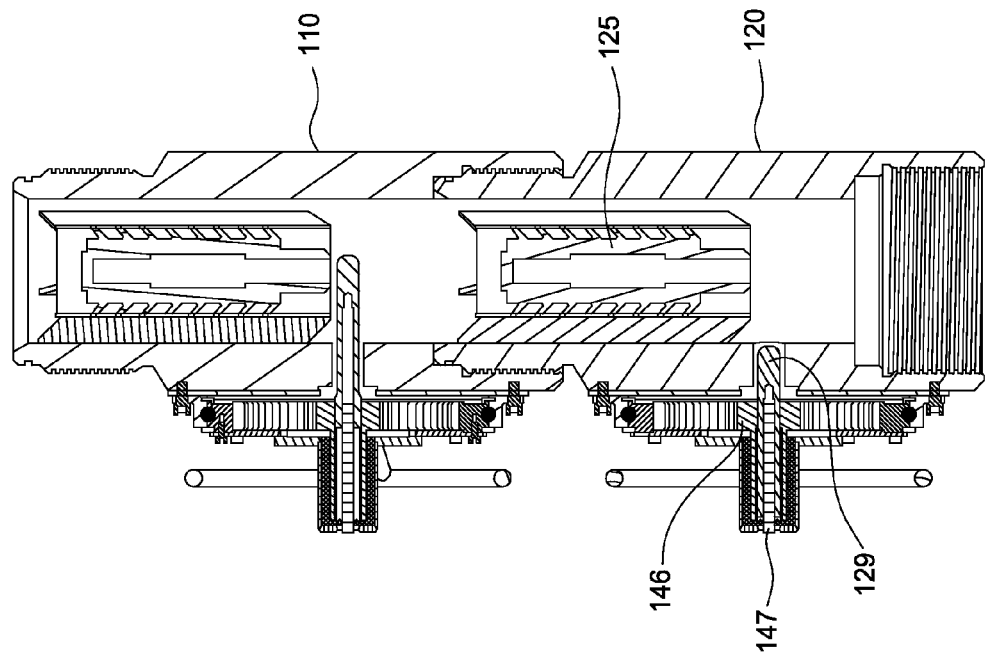
FIGS. 1B-1C illustrate sectional views of the holding device according to one embodiment.
Figure 1B:
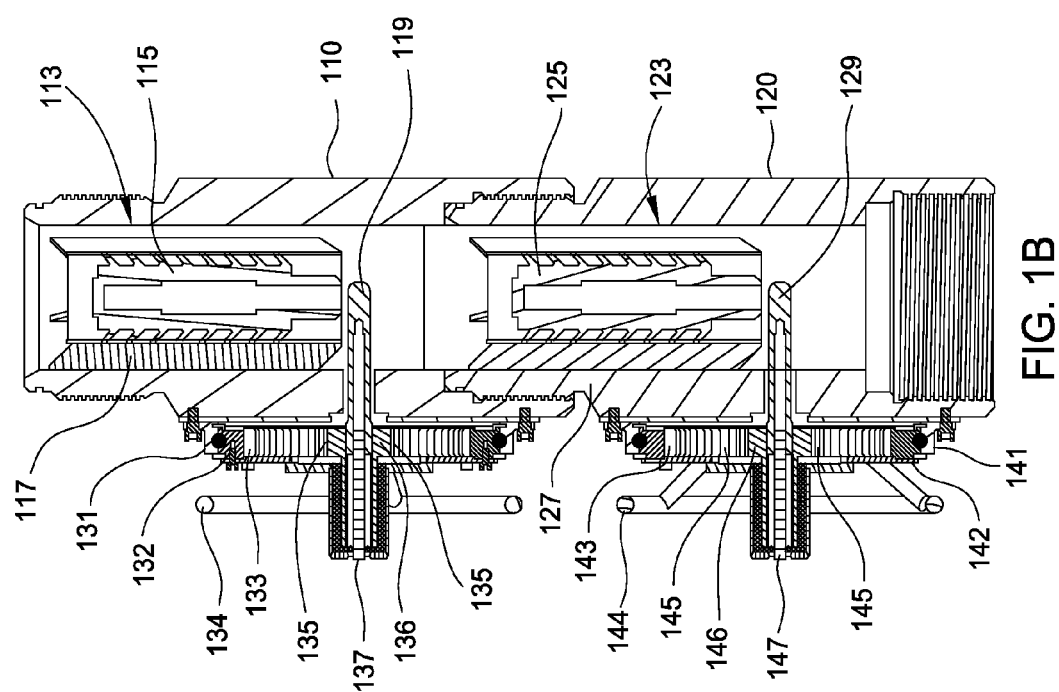

FIG. 1B illustrates retaining members 117, 127, such as sleeves or tubular type members, disposed in the bores of the upper and lower tubular members 110, 120 for supporting plugs 115, 125, respectively. Plungers 119, 129 (or other support type members) are radially movable into and out of the bores of the upper and lower tubular members 110, 120 by actuation of the first and second release mechanisms 130, 140, respectively. The plungers 119, 129 may support the plugs 115, 125 from beneath to secure the plugs 115, 125 within the holding device 100 and thereby prevent the plugs 115, 125 from dropping through the holding device 100 until desired.

Fluid may flow through the bores of the upper and lower tubular members 110, 120, and in particular may flow through one or more flow passages 113, 123 formed between the outer surface of the retaining members 117, 127 and the inner surface of the upper and lower tubular members 110, 120. Fluid flow may bypass the plugs 119, 129 through the flow passages 113, 123. The plungers 119, 129 may prevent the plugs 115, 125 from dropping through the holding device 100 while flowing fluid through the holding device 100.

When desired, the first and second release mechanisms 130, 140 may be selectively actuated to release the plugs 115, 125. The first and second release mechanisms 130, 140 include a planetary gear arrangement operable to quickly and easily retract the plungers 119, 129. In particular, the first and second release mechanisms 130, 140 include outer support housings 131, 141 coupled to the upper and lower tubular members 110, 120, respectively. Bearing members 132, 142 are disposed between the housings 131, 141 and annular gears 133, 143, which are rotated by handwheels 134, 144. Annular gears 133, 143 include internal gear teeth that engage external gear teeth on intermediate gears 135, 145. Intermediate gears 135, 145 are driven by rotation of the annular gears 133, 143, respectively, and in response rotate central gear members 136, 146.

Central gear members 136, 146 include external gear teeth that engage the external gear teeth of the intermediate gears 135, 145. Central gear members 136, 146 also include internal threads that engage external drive threads disposed on the plungers 119, 129. Rotation of the central gear members 136, 146 retract and extend the plungers 119, 129 radially into and out of the bores of the upper and lower tubular members 110, 120 to release the plugs 115, 125. Guide members 137, 147 may extend into internal bores of the plungers 119, 129 to guide the plungers 119, 129 as they are moved radially relative to the holding device 100. The plungers 119, 129, may be moved from the retracted position back into a securing position by rotation of the handwheels 134, 144 and the planetary gear arrangement in the opposite direction. In one embodiment, the handwheels 134, 144 may be rotated manually or by using a mechanical and/or automated device, such as a motor, piston/cylinder, etc.

As illustrated in FIG. 1C, the plunger 129 is retracted by operation of the second release mechanism 140 as described above to release the plug 125. The plug 115 may subsequently be released using the first release mechanism 130 when desired. Fluid may be flowing or may be stopped from flowing through the holding device 100 during actuation of the first and/or second release mechanisms 130, 140. In this manner, the mechanical advantage of the planetary gear ratio reduction of the first and second release mechanisms 130, 140 enable quick release of the plugs 115, 125 with a minimal number of turns of the handwheels 134, 144.

In one embodiment, the plug 125 and the retaining member 127 may be released from the holding device 100. The retaining member 127 may land on a seat disposed within the holding device 100 or at some location below the holding device 100 such that fluid flow around the retaining member 127 is prevented. Pressurized fluid flow, such as from a cement slurry, may force the plug 125 out of the retaining member 127.

The plug 125 may be dropped through a tubular string disposed in a wellbore ahead of a cement slurry flowing through the holding device 100 and seat near the end of the tubular string. The plug 115 may be released from the holding device 100 behind the cement slurry. The pressurized cement slurry may rupture a disc or other frangible member of the plug 125 and flow through the plug 125 until the plug 115 sealingly seats on the plug 125, thereby providing a pressure rise indication that the cement slurry has been circulated to the appropriate location. The plugs 115, 125 may then be sheared from the tubular string and/or drilled through for subsequent operations.

Figure 2A:
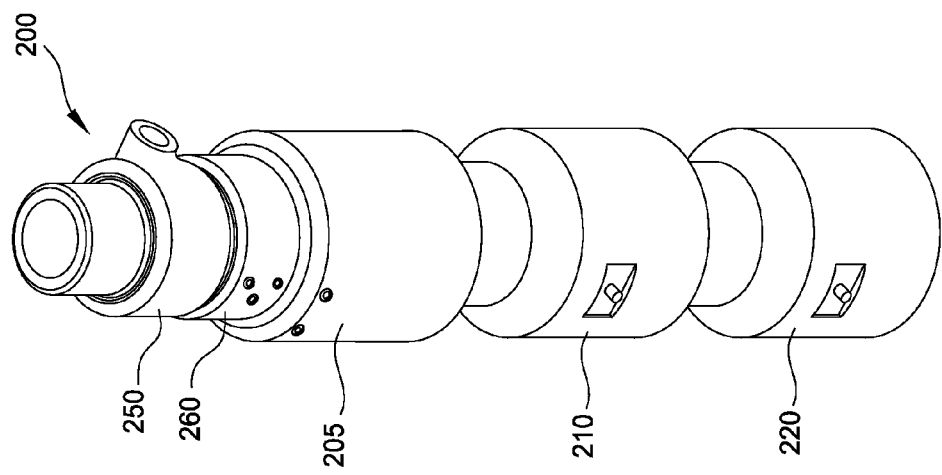
FIGS. 2A-2C illustrate another holding device according to one embodiment.
Figure 2B:
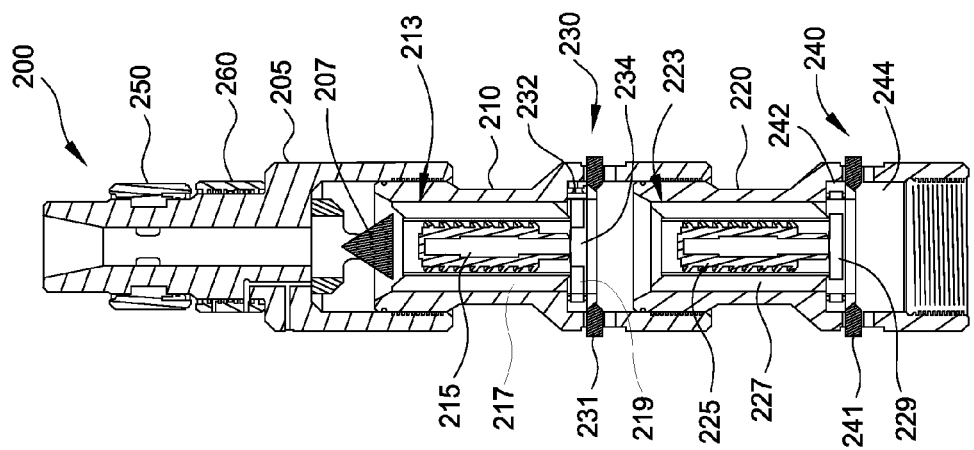
Figure 2C:
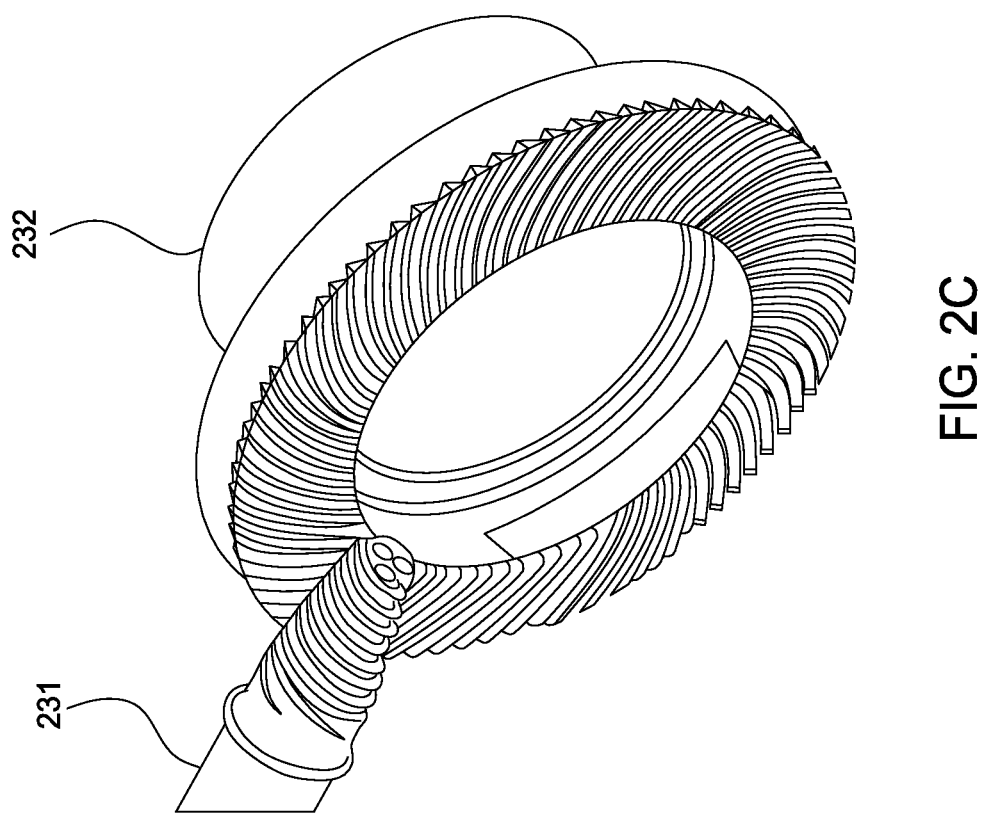

FIGS. 2A and 2B illustrate a holding device 200 according to one embodiment. The holding device 200 includes a top sub 205, an upper tubular member 210, and a lower tubular member 220, each coupled together such as by threaded connections. The holding device 200 further includes a first release mechanism 230 and a second release mechanism 240. The top sub 205 and upper and lower tubular members 210, 220 may be similarly coupled to other tubular strings, devices, and/or equipment as known in the art. The holding device 200 is operable to secure and release one or more ball, dart, and/or plug type members supported within the holding device 200, while permitting fluid flow through the top sub 205 and upper and lower tubular members 210, 220. A cementing swivel 250 may be coupled to the top sub 205 for supplying a cement slurry into the holding device 200. A hydraulic/pneumatic swivel 260 may also be coupled to the top sub 205 for fluid communication to and from one or more components of the holding device 200.

FIG. 2B illustrates retaining members 217, 227, such as sleeves or tubular type members, disposed in the bores of the upper and lower tubular members 210, 220 for supporting plugs 215, 225, respectively. Support fingers 219, 229 (or other support type members) are movable within the bores of the upper and lower tubular members 210, 220 by actuation of the first and second release mechanisms 230, 240, respectively. The fingers 219, 229 may support the plugs 215, 225 from beneath to secure the plugs 215, 225 within the holding device 200 and thereby prevent the plugs 215, 225 from dropping through the holding device 200 until desired.

Fluid may flow through the bore of the top sub 205, and may be diverted by a diverter 207 (or other similar type of flow divider) disposed within the top sub 205. The diverter 207 may direct the fluid flow into the upper and lower tubular members 210, 220, and in particular may direct the fluid flow into one or more flow passages 213, 223 formed between the outer surface of the retaining members 217, 227 and the inner surface of the upper and lower tubular members 210, 220. Fluid flow may bypass the plugs 215, 225 through the flow passages 213, 223. The fingers 219, 229 may prevent the plugs 215, 225 from dropping through the holding device 200 while flowing fluid through the holding device 200.

Referring to FIGS. 2C-2G, when desired, the first and second release mechanisms 230, 240 may be selectively actuated to release the plugs 215, 225. The first and second release mechanisms 230, 240 include a rotatable bevel gear arrangement operable to quickly and easily retract the fingers 219, 229. In particular, the first and second release mechanisms 230, 240 include drive shafts 231, 241 extending through the upper and lower tubular members 210, 220, respectively, and having gear teeth engaging gear teeth on activator rings 232, 242. The activator rings 232, 242 are supported within the upper and lower tubular members 210, 220 and are rotatable by rotation of the drive shafts 231, 241.

Support rings 234, 244 are also supported within the upper and lower tubular members 210, 220 adjacent the activator rings 232, 242 for supporting a pivotal connection to the fingers 219, 229. The fingers 219, 229 are rotatable into and out of one or more recesses formed in the support rings 234, 244 via a threaded engagement 233 formed between the fingers 219, 229 and the activator rings 232, 242. In particular, the drive shafts 231, 241 are rotated to rotate the activator rings 232, 242, which rotation via the threaded engagement 233 pivots the fingers 219, 229 from an extended position into a retracted position within the recesses formed in the support rings 234, 244. The fingers 219, 229 may be moved from the retracted position back into the extended, securing position by rotation of the drive shafts 231, 241 and the activator rings 232, 242 in the opposite direction.

Figure 2E:
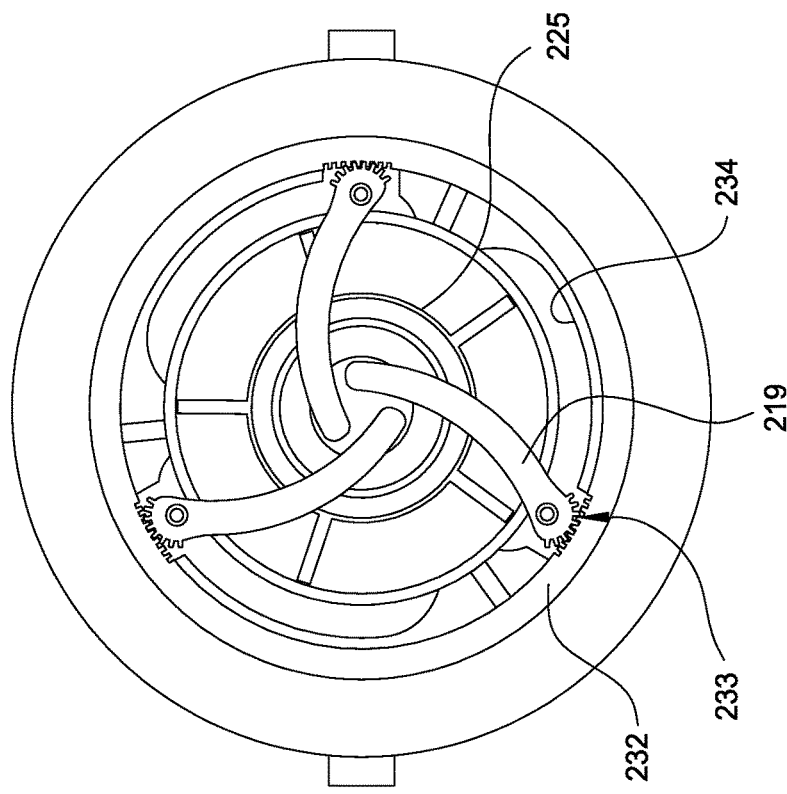
FIGS. 2D-2E illustrate bottom and top elevational views, respectively, of the holding device in a first operation position according to one embodiment.
Figure 2D:
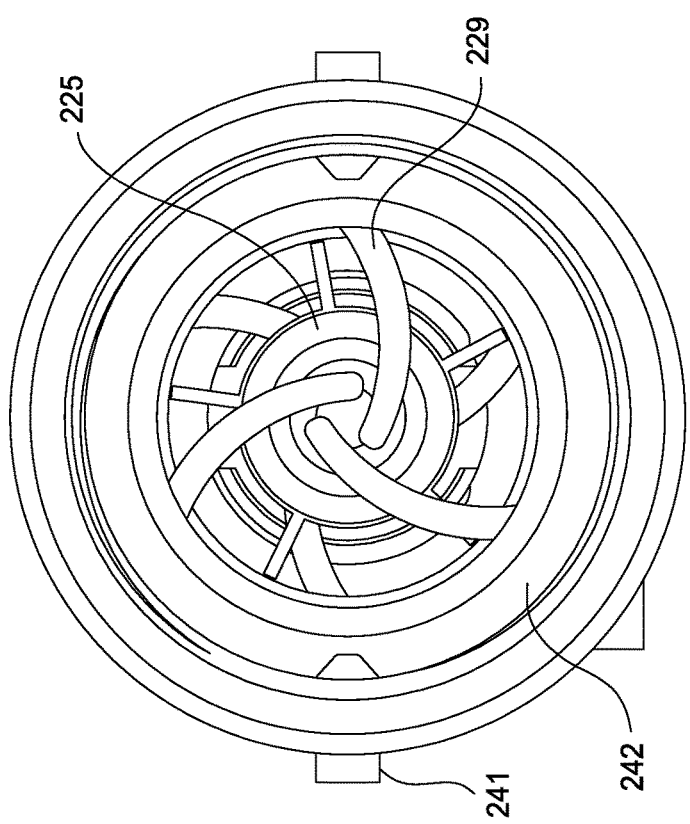

As illustrated in FIGS. 2D and 2E, the fingers 219, 219 are preventing the plugs 215, 225 from dropping through the holding device 200.

Figure 2G:
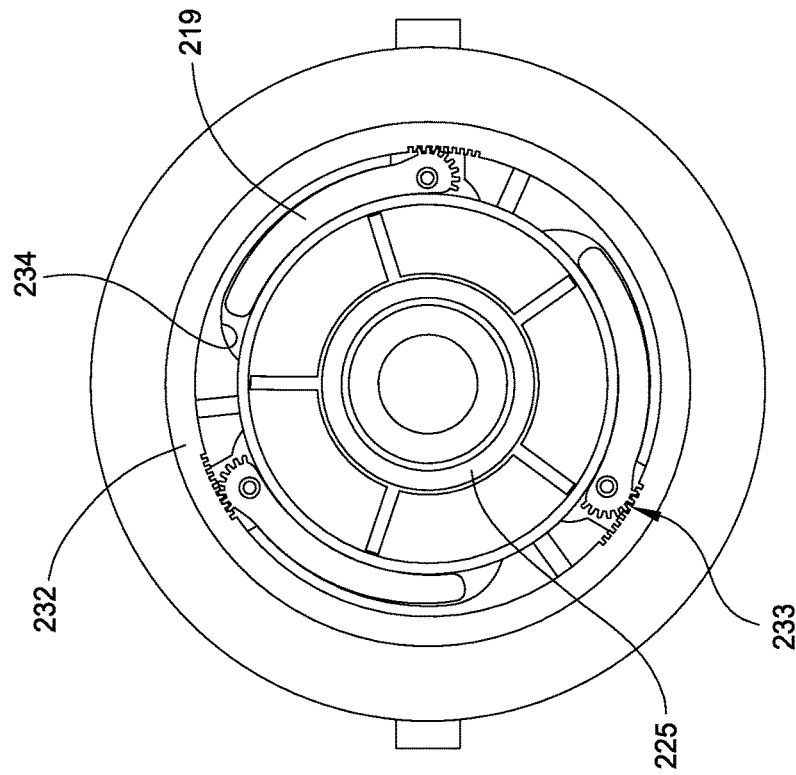
FIGS. 2F-2G illustrate bottom and top elevational views, respectively, of the holding device in a second operation position according to one embodiment.
Figure 2F:
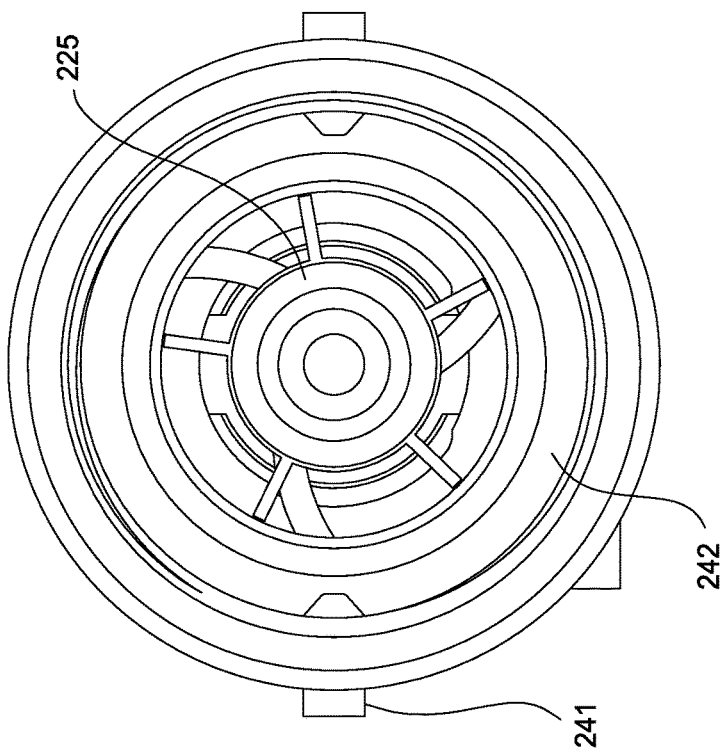

As illustrated in FIGS. 2F and 2G, the fingers 229 have been retracted by operation of the second release mechanism 240 as described above to release the plug 225. The plug 215 may subsequently be released using the first release mechanism 230 when desired. Fluid may be flowing or may be stopped from flowing through the holding device 200 during actuation of the first and/or second release mechanisms 230, 240. In this manner, the mechanical advantage of the bevel gear arrangement of the first and second release mechanisms 230, 240 enable quick release of the plugs 215, 225 with a minimal number of turns of the drive shafts 231, 241. In one embodiment, the drive shafts 231, 241 may be rotated manually or by using a mechanical and/or automated device, such as a motor, piston/cylinder, etc.

Figure 3A:
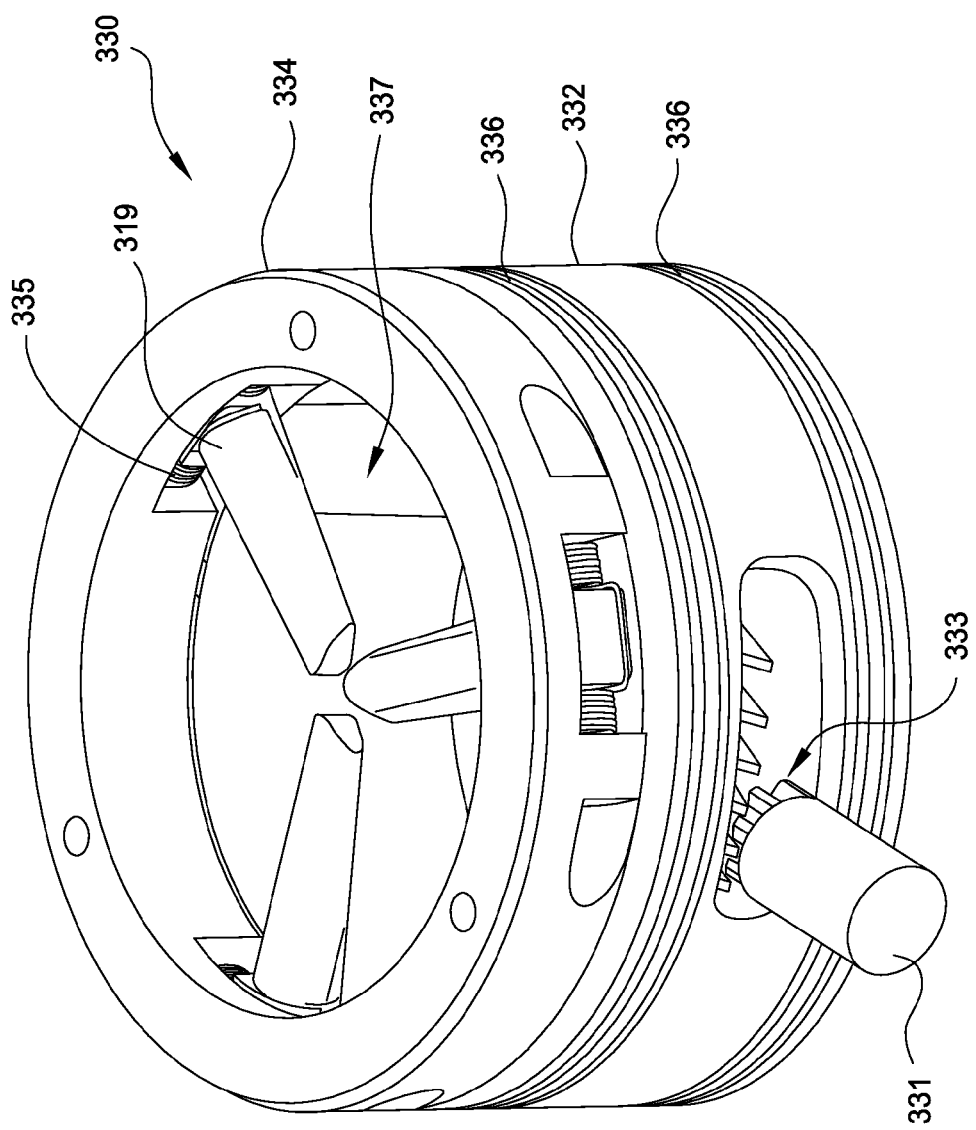
Figure 3B:
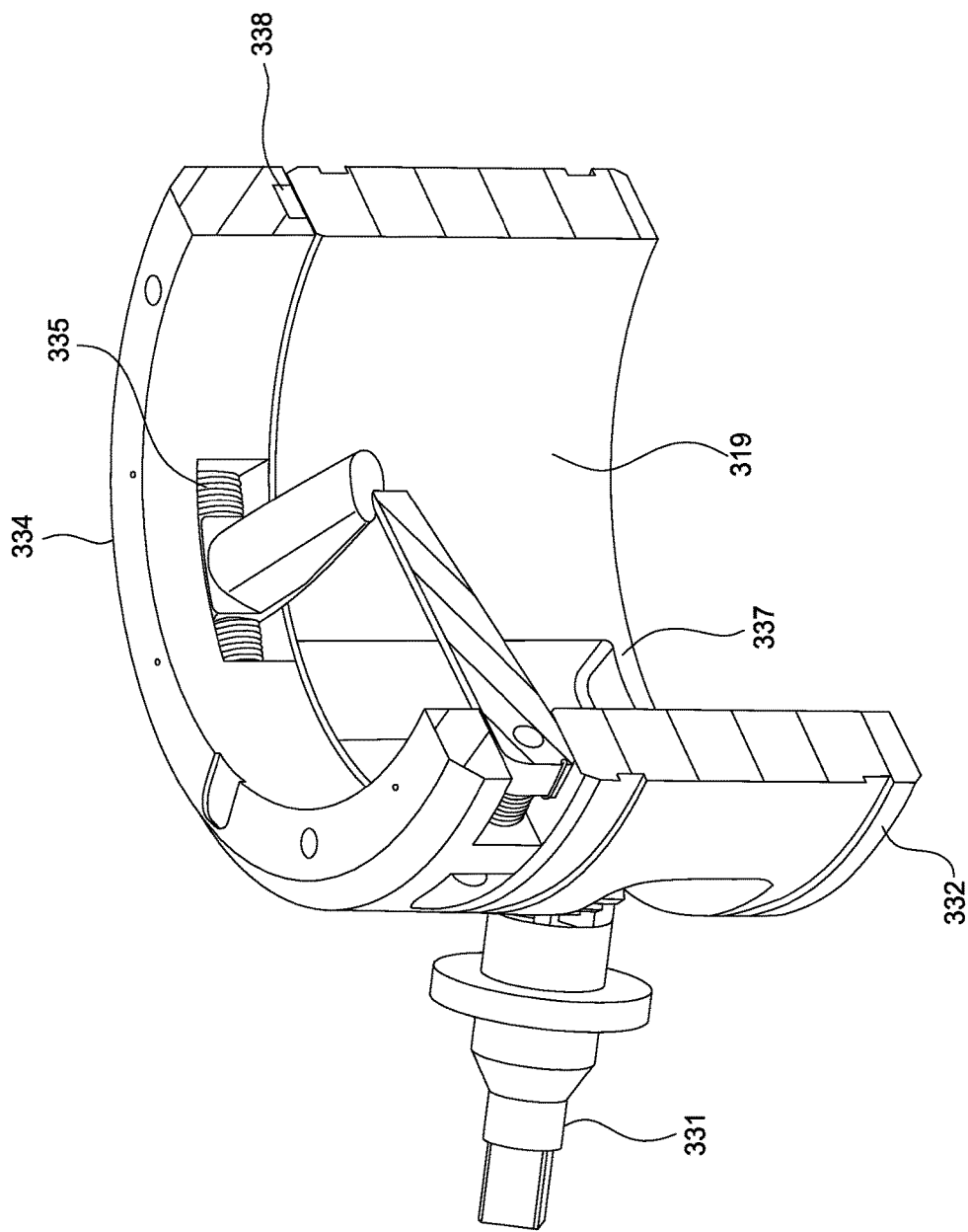
Figure 3D:
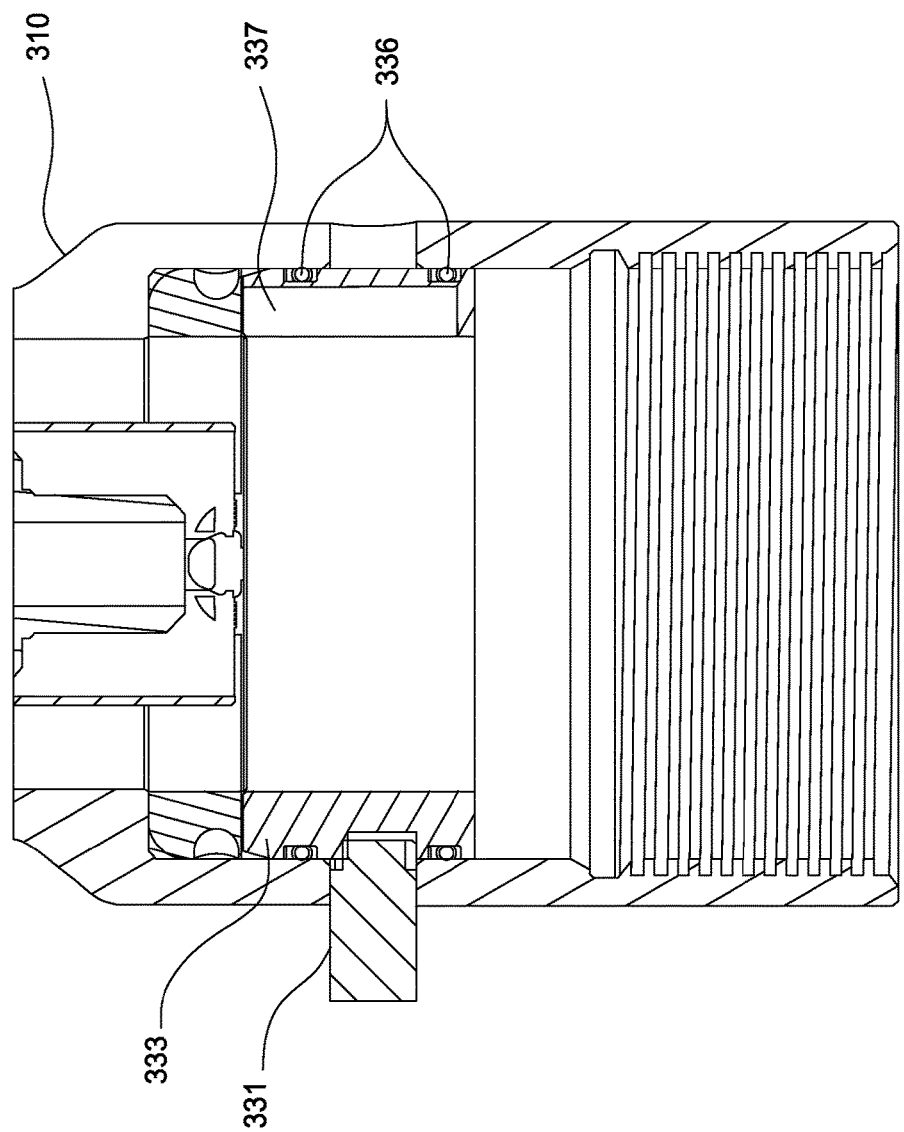
Figure 3E:
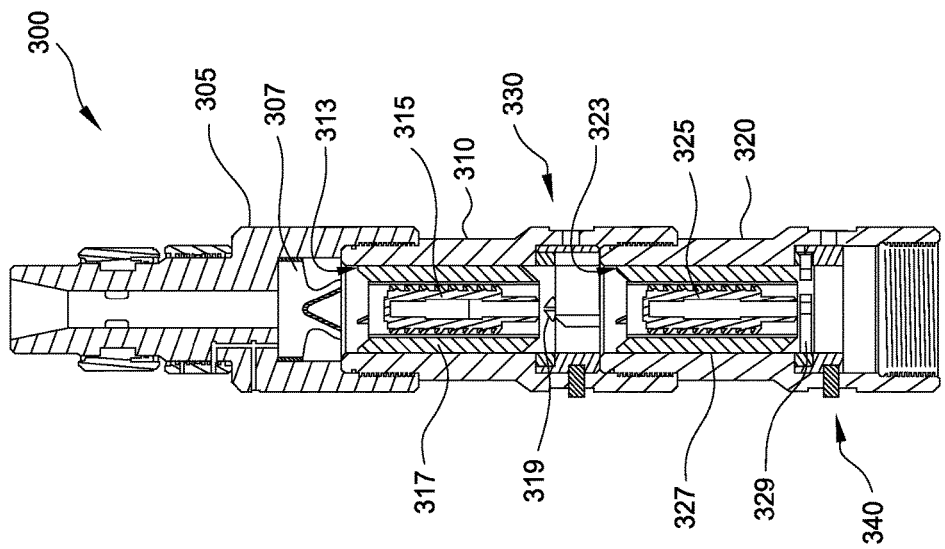
FIG. 3E illustrates another holding device that includes the release mechanism according to one embodiment.

FIGS. 3A-3D illustrate a first release mechanism 330 for a holding device 300 as illustrated in FIG. 3E according to one embodiment.

Referring to FIG. 3E, the holding device 300 includes a top sub 305, an upper tubular member 310, and a lower tubular member 320, each coupled together such as by threaded connections. The holding device 300 further includes the first release mechanism 330 and a second release mechanism 340. The top sub 305 and upper and lower tubular members 310, 320 may be similarly coupled to other tubular strings, devices, and/or equipment as known in the art. The holding device 300 is operable to secure and release one or more ball, dart, and/or plug type members supported within the holding device 300, while permitting fluid flow through the top sub 305 and upper and lower tubular members 310, 320. Retaining members 317, 327, such as sleeves or tubular type members, disposed in the bores of the upper and lower tubular members 310, 220 for supporting plugs 315, 325, respectively.

Fluid may flow through the bore of the top sub 305, and may be diverted by a diverter 307 (or other similar type of flow divider) disposed within the top sub 305. The diverter 307 may direct the fluid flow into the upper and lower tubular members 310, 320, and in particular may direct the fluid flow into one or more flow passages 313, 323 formed between the outer surface of the retaining members 317, 327 and the inner surface of the upper and lower tubular members 310, 320. Fluid flow may bypass the plugs 315, 325 through the flow passages 313, 323.

Support fingers 319, 329 may prevent the plugs 315, 325 from dropping through the holding device 300 while flowing fluid through the holding device 300 as further described below. The support fingers 319, 329 (or other support type members) are movable within the bores of the upper and lower tubular members 310, 320 by actuation of the first and second release mechanisms 330, 340, respectively. The fingers 319, 329 may support the plugs 315, 325 from beneath to secure the plugs 315, 325 within the holding device 300 and thereby prevent the plugs 315, 325 from dropping through the holding device 300 until desired.

Referring to FIGS. 3A-3D, when desired, the first and second release mechanisms 330, 340 may be selectively actuated to release the plugs 315, 325. Reference made herein to the first release mechanism 330 is equally applicable to the second release mechanism 340. The first release mechanism 330 includes a rotatable gear arrangement operable to quickly and easily retract the fingers 319. In particular, the first release mechanism 330 includes a drive shaft 331 extending through the upper tubular member 310 and having a gear engagement 333 with an activator ring 332. The activator ring 332 is supported within the upper tubular member 310 and is rotatable by rotation of the drive shaft 331 via the gear engagement 333.

A support ring 334 is also supported within the upper tubular member 310 adjacent the activator ring 332 for supporting a pivotal, spring connection to the fingers 319. The fingers 319 are rotatable into and out of one or more recesses 337 formed in the activator ring 332 via a biasing member 335, such as a spring, coupled to the fingers 319 and disposed between the support ring 334 and the activator ring 332. In particular, the drive shaft 331 is rotated to rotate the activator ring 332, which moves the recesses 337 into alignment with the fingers 319 and enables the biasing member 335 to pivot the fingers 319 from a horizontal, extended position into a vertical, retracted position within the recesses 337 formed in the activator ring 332. The fingers 319, 329 may be moved from the retracted position back into the extended, securing position by rotation of the drive shafts 331, 341 and the activator rings 332, 342 in the opposite direction. In one embodiment, the drive shafts 331, 341 may be rotated manually or by using a mechanical and/or automated device, such as a motor, piston/cylinder, etc.

One or more seals and/or bearing members 336 may be disposed between the activator ring 332 and the surrounding tubular member 310 for sealing and/or ease of rotation of the activator ring 332 relative to the tubular member 310. In one embodiment, the members 336 may be guide rings or members directing the rotation of the activator ring 332 concentrically within the holding device 300. Another bearing member 338 may be disposed between the activator ring 332 and the support ring 334 to reduce friction for ease of rotation of the activator ring 332 relative to the support ring 334. A support clamp 339 may be coupled to the tubular members 310, 320 for supporting the drive shafts 331, 341 and may house one or more bearing members for ease of rotation of the drive shafts 331, 341.

Figure 3G:
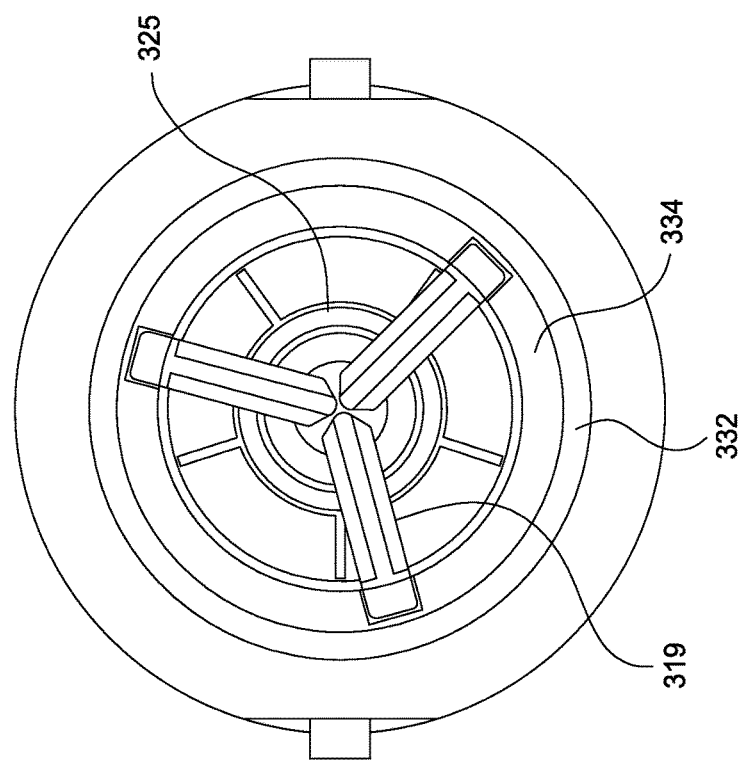
FIGS. 3F-3G illustrate bottom and top elevational views, respectively, of the holding device in a first operation position according to one embodiment.
Figure 3F:
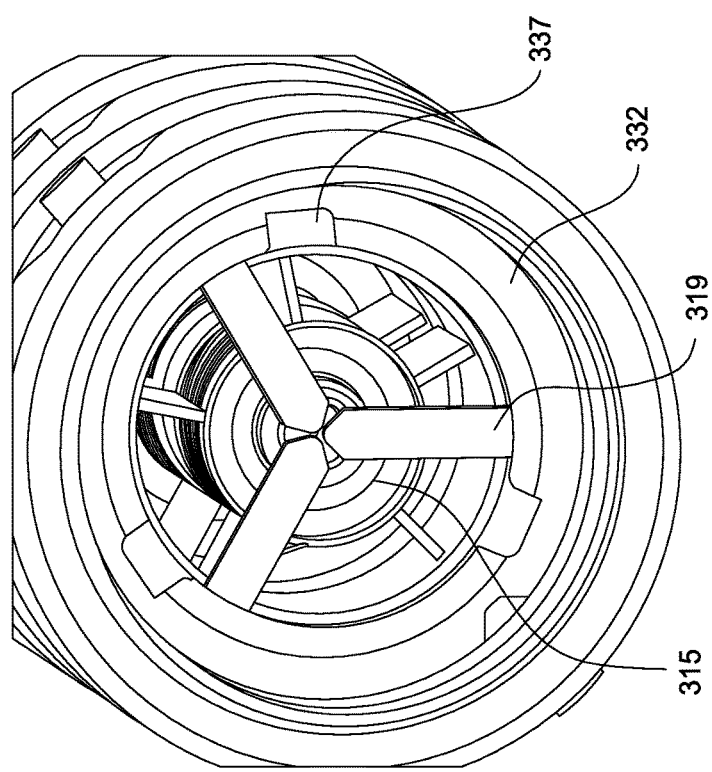

Referring to FIGS. 3F and 3G, the fingers 319, 329 are preventing the plugs 315, 325 from dropping through the holding device 300.

Referring to FIGS. 3H and 3I, the fingers 319, 329 have been retracted by operation of the first and second release mechanisms 330, 340 as described above to release the plugs 315, 325. The plug 315 may be released using the first release mechanism 330 subsequent to the release of the plug 325 by the second release mechanism 340 when desired.

Fluid may be flowing or may be stopped from flowing through the holding device 300 during actuation of the first and/or second release mechanisms 330, 340. In this manner, the mechanical advantage of the gear arrangement of the first and second release mechanisms 330, 340 enable quick release of the plugs 315, 325 with a minimal number of turns of the drive shafts 331, 341.

Figure 3K:
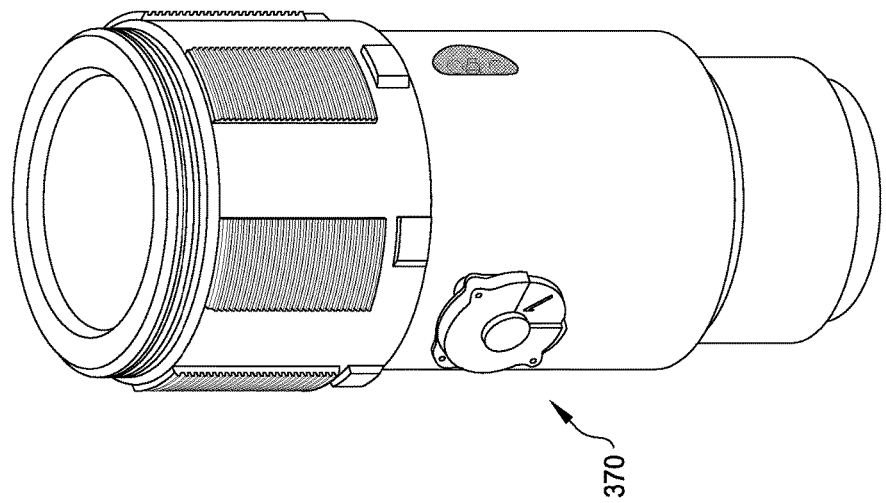
FIGS. 3J-3K illustrate an indication mechanism according to one embodiment.
Figure 3J:
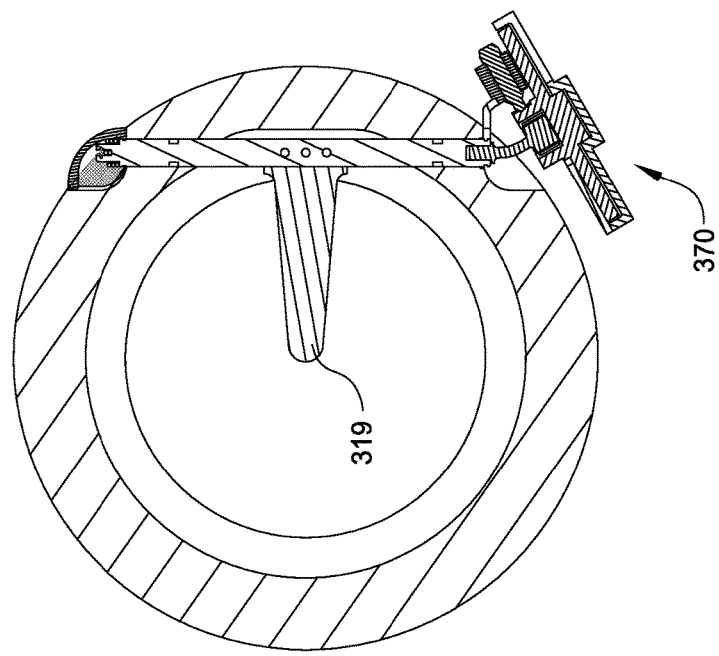

As illustrated in FIGS. 3J and 3K, an indication mechanism 370 may be provided to provide a visual indication of the position of the fingers 319, 329. The indication mechanism 370 may provide a visual indication external to the holding device 300 to indicate whether the fingers 319, 329 are in the securing position or the retracted position. The holding devices 100, 200 may similarly include indication mechanisms for indicating the position of the release mechanisms 130, 140, 230, 240.

Embodiments of the holding devices 100, 200, 300 may be combined with (in whole or in part) with one or more other embodiments of the holding devices 100, 200, 300. Although the holding devices 100, 200, 300 are illustrated with securing and releasing two plug type members, the embodiments of the holding devices 100, 200, 300 may be used with any number of ball, dart, and/or plug type members. Fluid, such as cement, may be supplied through the holding devices 100, 200, 300 before, during, and/or after actuation of the release mechanisms of the holding devices 100, 200, 300.

While the foregoing is directed to embodiments of the invention, other and further embodiments of the invention may be devised without departing from the basic scope thereof, and the scope thereof is determined by the claims that follow.

The invention claimed is:

1. A release mechanism, comprising:
   a tubular member having a flow bore;
   a support member movable from an extended position to a retracted position and configured to support a release member;
   a rotatable actuation member that is rotatable concentrically with the tubular member from a first position wherein the support member is in the extended position to a second position wherein the support member is in the retracted position, the support member being located within a recess formed in the rotatable actuation member when in the retracted position; and
   a drive member for rotating the rotatable actuation member.

2. The release mechanism of claim 1, wherein the support member is radially movable between the extended position and the retracted position.

3. The release mechanism of claim 1, wherein the support member is pivoted between the extended position and the retracted position.

4. The release mechanism of claim 1, wherein the support member is in a substantially horizontal position when in the extended position and in a substantially vertical position when in the retracted position.

5. The release mechanism of claim 1, wherein the support member is movable into the recess via a biasing member when the support member is in alignment with the recess.

6. The release mechanism of claim 1, wherein the support member is movable between the extended position and the retracted position within the flow bore.

7. The release mechanism of claim 6, further comprising an indication mechanism configured to provide a visual indication when the support member is in the extended position or the retracted position.

8. The release mechanism of claim 1, wherein the release member includes at least one of a ball, dart, or plug type member.

9. A method of operating a release mechanism, comprising:
   retaining a release member within a flow bore of a tubular member of the release mechanism, the release member being retained within the flow bore by a support member;
   flowing fluid through the flow bore of the tubular member of the release mechanism while retaining the release member within the flow bore via the support member, the fluid flowing around the release member retained within the flow bore;
   rotating an actuation member concentrically with the tubular member to move the support member from an extended position that retains the release member within the flow bore to a retracted position that releases the release member from the flow bore; and
   releasing the release member from the release mechanism.

10. The method of claim 9, wherein the release member includes at least one of a ball, dart, or plug type member.

11. The method of claim 9, further comprising radially moving the support member between the extended position and the retracted position.

12. The method of claim 9, further comprising moving the support member from a substantially horizontal position when in the extended position to a substantially vertical position when in the retracted position.

13. The method of claim 9, further comprising rotating the actuation member via a gear arrangement.

14. The method of claim 9, further comprising moving the support member into a recess formed in the actuation member when moved to the retracted position.

15. The method of claim 14, wherein the support member is movable into the recess via a threaded engagement or a biasing member.

16. A method of operating a release mechanism, comprising:
   flowing fluid through a flow bore of a tubular member of the release mechanism while retaining a release member within the flow bore via a support member;
   rotating an actuation member concentrically with the tubular member;
   moving the support member from an extended position that retains the release member within the flow bore to a retracted position that releases the release member from the flow bore, the support member located in a recess formed in the actuation member when in the retracted position; and
   releasing the release member from the release mechanism.

* * * * *